Sept. 30, 1941.                A. G. LARSON                    2,257,301
                               BRAKE SYSTEM
                          Filed Oct. 31, 1939              3 Sheets-Sheet 1
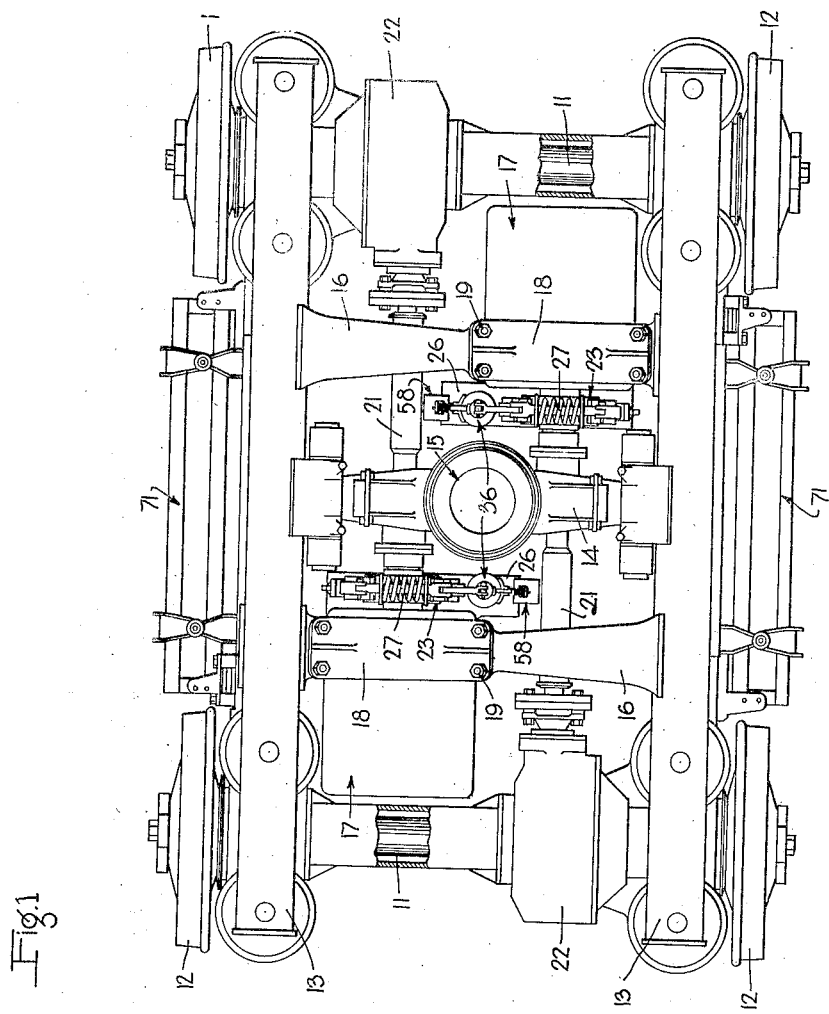
INVENTOR
ARTHUR G. LARSON
BY
ATTORNEY Sept. 30, 1941. A. G. LARSON 2,257,301
BRAKE SYSTEM
Filed Oct. 31, 1939 3 Sheets-Sheet 2
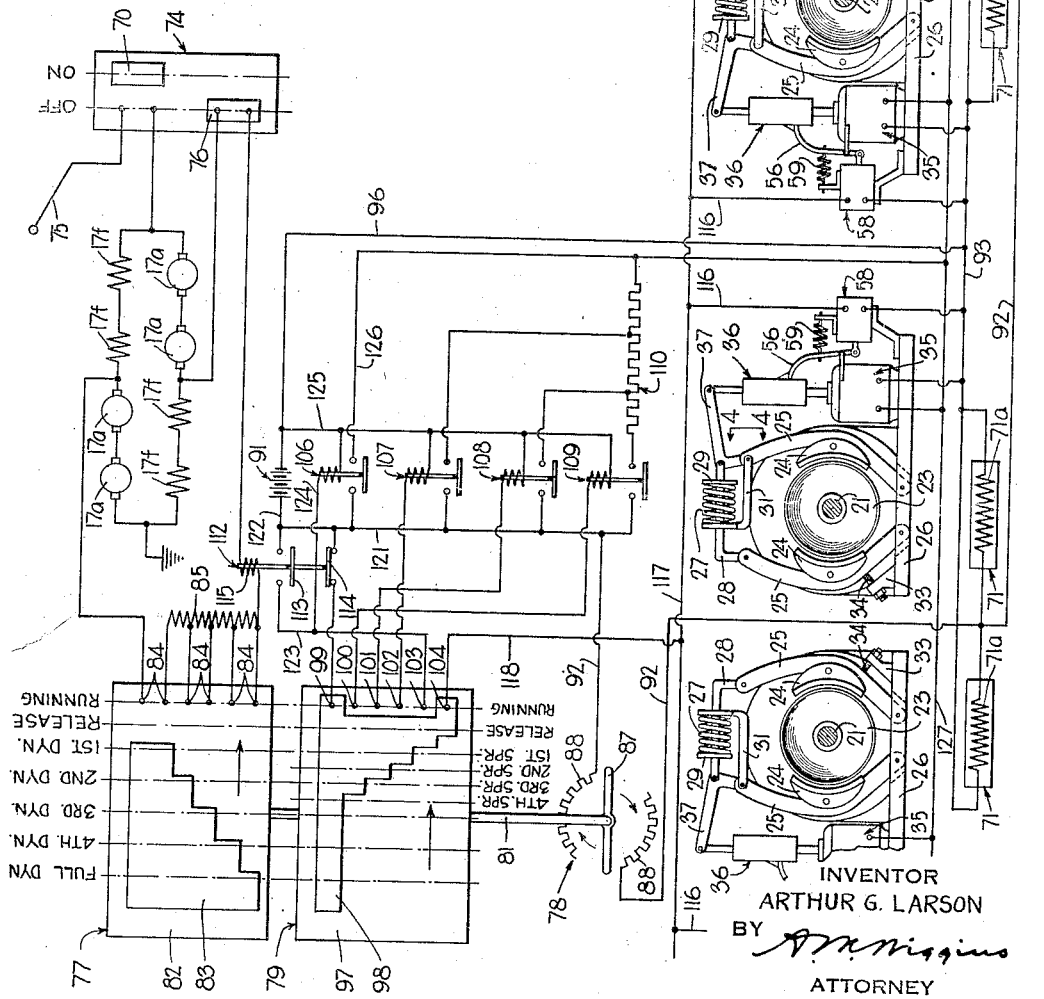

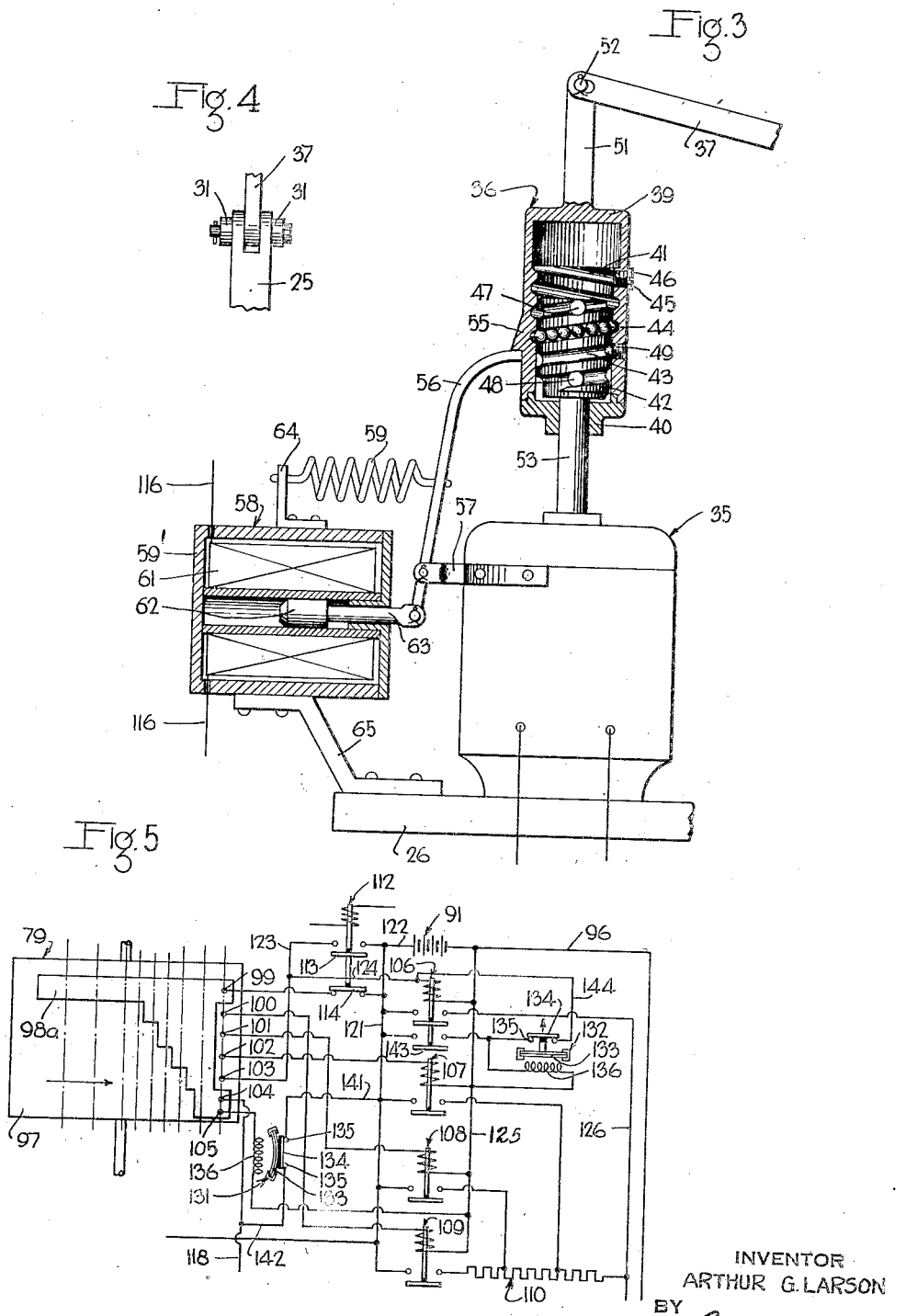

Patented Sept. 30, 1941

2,257,301

UNITED STATES PATENT OFFICE 2,257,301

BRAKE SYSTEM

Arthur G. Larson, Forest Hills, Pa., assignor to The Westinghouse Air Brake Company, Wilmerding, Pa., a corporation of Pennsylvania Application October 31, 1939, Serial No. 302,159

18 Claims. (Cl. 188—2)

This invention relates to brake systems for vehicles, such as street railway cars, and has particular relation to brake systems of the type having a coordinated arrangement of dynamic brakes, magnetic track brakes and friction brakes associated with the vehicle wheels.

It is an object of my invention to provide a vehicle brake system having a novel coordination of dynamic brakes, magnetic track brakes, and friction brakes.

More specifically, it is an object of my invention to provide a brake system, of the character indicated in the foregoing object, and including a friction brake device of the spring-applied, electrically-released type.

It is another object of my invention to provide a friction brake device of the spring-applied type in which the degree of application of the brakes may be varied, and the release of the brakes effected, under the control of an electric motor of the torque type.

It is another object of my invention to provide a car brake system, of the type indicated in the foregoing objects, and including a friction brake device for the wheels of the car of the spring-applied, torque-motor-controlled type in which the degree of application and the release of the brake is coordinated with the operation of the dynamic brake and the magnetic track brake.

It is another object of my invention to provide a friction brake device, of the spring-applied, torque-motor-controlled type, further characterized by a latch mechanism for holding the brakes released independently of the torque motor, and novel control mechanism for the latch mechanism.

It is another object of my invention to provide a brake system, of the type indicated in the foregoing objects, in which the dynamic brake is effective to suppress or delay the application of the friction brake initiated simultaneously with the application of the dynamic brake as long as the degree of the dynamic brake application exceeds a certain value, and further characterized by novel means effective upon initiation of a brake application to prevent the undesired application of the friction brake during the time that the dynamic brake application is increasing to the selected value and is ineffective to suppress the application of the friction brake.

It is another object of my invention to provide friction brake apparatus of the spring-applied, torque-motor-controlled type including a latch mechanism for holding the brakes released independently of the torque motor, and further characterized by means for delaying the release of the latch means for a limited time following initiation of a brake application and means for insuring the continued release of the friction brakes by the torque motor until the latch means is released.

The above objects, and other objects of my invention will be made apparent hereinafter, are obtained by means of apparatus subsequently to be described and shown in the accompanying drawings, wherein Fig. 1 is a plan view of a street railway car truck, showing the manner of application of the spring-applied, torque-motor-controlled friction brake apparatus to the drive shafts of the propulsion motors.

Fig. 2 is a diagrammatic view, showing one embodiment of a car brake equipment embodying the features of my invention, Fig. 3 is an enlarged fragmental view, largely in section, showing structural details of the motor-operated mechanism and the latch mechanism for the friction brake apparatus shown in Fig. 2, Fig. 4 is an enlarged fragmental view, taken on the line 4—4 of Fig. 1, showing the cooperative arrangement of certain of the parts of the friction brake apparatus, and Fig. 5 is a fragmental diagrammatic view, showing a modification of the control apparatus shown in Fig. 2.

Description of equipment

Referring to Fig. 1, the wheel truck shown, which is typical of that at each end of the car, comprises a pair of wheel axles 11, to the opposite ends of which the car wheels 12 are fixed. Extending from axle to axle on each side of the truck are side frame members 13, illustrated as of tubular construction, which are suitably guided and resiliently supported for vertical movement with respect to the axles.

Suitably secured to the two-side frame members 13, respectively, is a central transverse member or truck bolster 14 in which a suitable bearing seat and bore 15 is provided for receiving the swivel pin (not shown) that is attached to the body bolster of the car. On opposite sides of the bolster 14 are two motor-supporting transoms or struts 16, each of which is secured at the opposite ends thereof to the two side frame members 13 respectively. Each transom 16 is suitably formed to receive and support a propulsion motor 17, and a clamping cover or strap 18 is removably secured thereto, as by bolts or screws 19, to hold the motor in the transom.

Each motor 17 has its armature shaft connected to a drive shaft 21 that is adapted to drive a corresponding axle 11 through a corresponding gear box or mechanism 22.

Secured to each drive shaft 21 adjacent the end cover of the associated propulsion motor 17 is a brake drum 23 with which friction brake shoes 24 (see Fig. 2) are adapted to engage to effect the braking of the wheels 12 driven by the corresponding motor 17.

Referring to Fig. 2, it will be seen that a pair of brake shoes 24 is provided for each brake drum 23, the shoes being arranged in diametrical relation on opposite sides of the drum and pivotally supported on corresponding brake operating levers 25. The lower end of each of the two levers 25 is pivoted to a supporting pedestal or base 26 formed on or attached to the frame of the propulsion motor 17.

The two brake levers 25 are urged toward each other to effect application of the brake shoes 24 to the brake drum 23 by a coil spring 27.

As seen in Fig. 2, one of the brake levers 25 has pivoted to the upper end thereof a lever 28, of L-shape, to which a collar 29 is fixed. The other brake lever 25 has similarly pivoted to the upper end thereof a lever 31 of L-shape, one arm of the lever 31 being of annular or bifurcated construction to straddle or surround the lever 28. The spring 27 is compressively interposed between the collar 29 and the straddling arm of the lever 31 and is accordingly effective to urge the brake levers 25 toward each other in clamping relation to the brake drum 23.

Formed on the pedestal 26 is a stop lug 33 carrying an adjustable stop screw 34. The stop screw 34 is adapted to be engaged by one of the brake levers 25 to limit the movement thereof away from brake drum 23 and thereby determine the normal clearance distance between the brake shoes 24 and the brake drum 23 in the release position thereof, as will be explained more fully hereinafter.

The brake shoes 24 are adapted to be shifted out of engagement with the brake drum 23 to a release position, or applied with different degrees of force by the spring 27, under the control of an electric motor 35. Motor 35 is of the well-known torque type having a rotor (not shown) on which a torque force is produced proportional to the degree of energization of the motor windings, the rotor being stalled in a stopped position, while the motor windings are energized, without causing overheating or burning-out of the motor windings.

The motor 35 is adapted to operate a screw-jack 36, preferably of the ball-bearing type, that in turn raises or lowers an arm of a bell-crank lever 37. The bell-crank lever 37 is pivoted at the fulcrum thereof to the outer end of the lever 28 and one arm thereof is pivoted to the upper end of the brake lever 25 at the point of pivotal connection of the lever 31 thereto, in the manner shown in Fig. 4. Thus, when the outer end of the other arm of the bell-crank lever 37 is raised, the one brake lever 25 is first shifted into engagement with the stop screw 34 so that continued upward movement of the lever arm shifts the other brake lever 25 away from the said one brake lever 25 against the force of the spring 27, which is correspondingly compressed.

Referring to the enlarged view shown in Fig. 3, the screw-jack 36 comprises an outer sleeve 39, provided on the inner bore thereof with a spiral groove 41 of substantially semi-circular cross-section, and a screw 42 contained within the sleeve 39 and having an external spiral groove 43 of semi-circular cross-section corresponding to that of the spiral groove 41. Screw 42 is formed on or attached to the shaft 53 of the rotor of the motor 35. Sleeve 39 has a projecting stem 51 which is pivotally connected as by a pin 52 to the outer end of the bell-crank arm. Secured to the lower end of the sleeve 39, as by screws not shown, is an end cover or journal 40 which supports and guides the sleeve 39 for sliding movement on shaft 53.

Interlocking the sleeve 39 and the screw 42 are a plurality of steel balls or ball-bearings 44 that are received and confined in the circular spiral groove formed by the cooperating semi-circular spiral grooves 41 and 43.

Any desired number of balls 44 may be provided. For purposes of illustration, the number of balls 44 employed is sufficient to provide at least one complete turn around screw 42 when the balls are closely spaced.

In order to install the steel balls 44, the outer sleeve 39 is provided with an opening 45 in the wall thereof, through which the balls may be inserted when the sleeve 39 is lowered sufficiently on the screw 42 and the cooperating grooves 41 and 43 are in register with each other. A screw plug 46 is provided for closing the opening 45 after the balls are inserted.

The screw 42 is provided with suitable stop pins 47 and 48 at the upper and lower ends of the spiral groove 43 to prevent the balls from leaving the spiral groove. The outer sleeve 39 also has, in the wall thereof, a stop screw 49, the inner end of which is flush with the bore of the sleeve. Screw 49 limits the downward movement of the balls within the sleeve 39.

When current is supplied to the windings of the torque motor 35, in the manner subsequently described, torque is exerted on the rotor shaft 53 tending to rotate it in a clockwise direction looking down the shaft toward the motor. Screw 42 is correspondingly urged rotarily so as to exert a force tending to raise the sleeve 39. It will be seen that sleeve 39 is urged upwardly because screw 42 is held in a fixed axial position while the sleeve is prevented from rotating due to its connection to the bell-crank lever 37. It will be apparent that additional guide means (not shown) for preventing rotation of the sleeve 39 may be provided if desired.

The upward force exerted on sleeve 39 tends to raise the arm of bell-crank lever 37 in opposition to the expansive force of spring 27. Thus, the effective force with which spring 27 applies the brake shoes 24 to the brake drum 23 is progressively reduced as the upward force on bell-crank lever 37 progressively increases in accordance with the increase of the torque on the rotor shaft 53 of the torque motor. It will thus be seen that the degree of application of the brake shoes 24 varies inversely with respect to the degree of current energizing the windings of torque motor 35.

If the torque motor windings are energized by a sufficient current, the corresponding torque on screw 42 will cause sleeve 39 to exert an upward force on the arm of bell-crank lever 37 sufficient to overcome the force of spring 27 and compress it, the sleeve 39 being correspondingly raised to force levers 25 apart to disengage brake shoes 24 from the brake drum 23 and thus cause release of the friction brakes.

It will be observed that when the brake levers 25 are being forced apart, the one lever engages stop screw 34. Stop screw 34 is so adjusted as to limit the movement of brake shoe 24 on this lever to a desired normal clearance distance with respect to the brake drum 23. Furthermore, the dimensions and relation of the levers 28, 31, and 37 are such that when the spring 27 is fully compressed, the brake shoe on the other brake lever 25 has a similar clearance distance with respect to the brake drum.

When the current energizing the torque motor windings is reduced from that value which effects release of the brakes, the torque on the motor shaft 53 correspondingly reduces and, as a result, the force urging sleeve 39 and the arm of bellcrank lever 37 upwardly is correspondingly reduced. Spring 27 thus acts to rock the bellcrank lever reversely to shift sleeve 39 downwardly. The inclination and pitch of the spiral grooves in the sleeve 39 and screw 42 are such that screw 42 is rotated reversely so as to permit downward movement of sleeve 39, the downward movement of sleeve 39 continuing until a balance of forces is attained. When the current energizing the torque motor windings is reduced sufficiently, the brake shoes 24 are again applied to the drum 23 with a force that varies inversely with the current energizing the torque motor windings, the maximum force of application of the brake shoes being attained when the torque motor windings are completely deenergized.

In order to hold the brake shoes 24 in release position without maintaining the windings of the torque motor 35 energized, a latch mechanism is provided which comprises a projecting lug 55 on the sleeve 39 of the screw-jack 36 and a cooperating latch lever 56. The latch lever 56 is pivotally mounted, as on a bracket 57 attached to the frame of the torque motor 35, and is rocked pivotally in a clockwise direction, as seen in Fig. 3, to a position under the lug 55, when sleeve 39 is in its raised position corresponding to release of the brakes, by a solenoid device 58 against the force of a return spring 59. The solenoid device 58 comprises a suitable casing 59' in which is contained a solenoid winding 61 effective when energized to shift a plunger 62 in the left-hand direction. The plunger 62 has a stem 63 which is pivotally connected to the lower end of the latch lever 56. Upon energization of the solenoid winding 61, the upper end of the latch lever 56 is shifted to a position beneath latch lug 55 on the sleeve 39, thereby maintaining it in its raised position in which the brakes are correspondingly held released.

When the solenoid winding 61 is deenergized the spring 59, which is secured at opposite ends to the lever 56 and a bracket 64 secured to the casing 59' of the solenoid device 58, acts to rock the latch lever 56 pivotally in a counterclockwise direction and thus moves the upper end of the lever from beneath the lug 55 to permit downward movement of sleeve 39. It will be observed that unlatching movement of lever 56 is limited by the engagement of the plunger 62 with the end plate on casing 59'.

The solenoid device 58 may be mounted in any suitable manner. For purposes of illustration, it is shown as carried on a bracket 65 that is secured to the supporting pedestal 26 of the brake operating levers 25.

Referring to Fig. 2, the complete brake system for a single car is shown as comprising four friction brake units associated respectively with the four axles on the car, four magnetic track devices 71, two of which are disposed on opposite sides respectively of each wheel truck, as shown in Fig. 1, between the leading and trailing wheels in a position to engage the track rail, and dynamic brake devices in the form of the propulsion motors 17 for the car arranged to act as dynamic brakes.

In Fig. 2, the armature winding and series field windings of the propulsion motors 17 are designated by the reference numerals 17a and 17f respectively. For simplicity, the windings of motors 17 are shown as connected in conventional series-parallel arrangement with propulsion current supplied thereto under the control of a power controller 74 from an external source through a trolley 75.

Power controller 74 is illustrated as having two positions designated "off" and "on" respectively. In the "off" position of the controller 74, the circuit for supplying propulsion current to the motors 17 is interrupted and an interlock switch 76 in the dynamic braking circuit is in closed position. In the "on" position of the motor controller 74, the interlock switch 76 is open and a switch 70 is closed to establish the power circuit for supplying propulsion current to the motors 17.

The motors 17 are adapted to be connected in a dynamic braking circuit under the control of a suitable controller 77 hereinafter referred to as the dynamic brake controller. The magnetic track brake devices 71 are under the control of a controller 78, hereinafter referred to as the track brake rheostat. The torque motors 35 of the friction brake units on the car are under the control of a controller 79, hereinafter called the spring brake controller, which controller also serves to control the latch solenoid windings 61.

The dynamic brake controller 77, the track brake rheostat 78 and the spring brake controller 79 are adapted to be simultaneously operated in synchronism by the operator of the car through either a hand or a foot-pedal operated device (not shown) in conventional manner. The simultaneous operation of the controllers and the rheostat is indicated by the common shaft 81 connecting them but it should be understood that the controllers and rheostat need not necessarily be associated through a single shaft.

As diagrammatically indicated, the dynamic brake controller 77 may comprise a rotary drum 82 having in insulated relation thereon a stepped contact segment 83 which is adapted to engage a row of stationary contact members 84.

The rotary drum 82 has a normal position designated "Running" position. Upon rotary movement of the drum 82 in the direction indicated by the arrow, as a result of the depression of a brake pedal or shifting of a brake handle by the operator, the rotary drum 82 passes successively through a plurality of positions, designated "Release," "1st dynamic," "2nd dynamic," "3rd dynamic," "4th dynamic," and "Full dynamic." The dynamic brake controller 77 is not effective to establish the dynamic braking circuit of the motors 17 until the rotary drum 82 is shifted into its "1st dynamic" position. In this position, the contact segment 83 connects the two upper contact members 84 to establish the dynamic braking circuit through a resistor 85. As the rotary drum 82 reaches successive positions thereafter, in moving toward "Full dynamic" position, the contact segment 83 engages other contact members 84 in succession to short-circuit an increasing amount of the resistor 85, thereby increasing the degree of the dynamic braking current in proportion to the degree of displacement of the drum out of its normal position.

The track brake rheostat 78 may comprise a rotary brush or contact device 87 which is moved in accordance with the movement of the dynamic brake controller drum 82 and which engages a commutator device (not shown) to the segments of which tap connections to two stationary resistors 88 are made. The arrangement of the brush device 87 and resistors 88 is such as to require a predetermined rotary displacement of the brush device out of its normal or release position in order to connect the two resistors and thereby complete a circuit for energizing the electromagnet windings 71a of the magnetic track brake devices to effect application thereof. In the present instance, it is assumed that the brush device 87 first establishes the circuit for energizing the windings of the magnetic track brakes when it reaches a position corresponding to the "3rd dynamic" position of the dynamic brake controller drum 82. It will be understood that the track brake devices are normally suspended a certain distance above the track rails by springs and moved into contact with the rails against the force of the suspension springs in response to energization of the electromagnet windings 71a thereof.

As the rotary displacement of the brush device 87 out of its normal position increases, it causes progressively increasing portions of the two resistors 88 to be cut out of the circuit, thereby increasing the current energizing the electromagnet windings 71a to correspondingly increase the degree of application of, or retarding effect exerted by, the track brake devices.

The source of current for energizing the electromagnet windings 71a of the magnetic track brake devices 71 is illustrated as a storage battery 91 of suitable voltage, such as 32 volts. Any other suitable source may, however, be provided.

The electromagnet windings 71a of the track brake devices 71 are connected in parallel relation across positive and negative bus wires 92 and 93, which may extend from car to car in a train of cars. The track brake rheostat 78 is interposed in the positive bus wire 92 in a manner to control the connection thereof to the positive terminal of the battery 91. The negative bus wire 93 is connected by a branch wire 96 to the negative terminal of the battery 91.

The spring brake controller 79, as diagrammatically shown, may comprise a rotary drum 97 having in insulated relation thereon a stepped contact segment 98 which cooperatively engages a row of contact members 99, 100, 101, 102, 103, and 104. The contour of the contact segment 98 is such that, in the position of the drum 97 corresponding to the "Running" position of the dynamic brake controller 77, the segment engages only contact members 99 and 104.

In the "Release" position of the dynamic brake controller, the contact segment 98 of the spring brake controller engages and connects all of the contact members 99 to 104. As the spring brake controller drum 97 is further displaced from the position corresponding to "Release" position of the dynamic brake controller in correspondence with the displacement of the dynamic brake controller drum, contact fingers 104, 103, 102, 101, and 100 are successively disengaged by the contact segment 98 in the order mentioned.

The position of the spring brake controller drum 97 in which the contact member 103 has just been disengaged by the contact segment 98 corresponds to the "1st dynamic" position of the dynamic brake controller drum 82 and is designated "1st spring" position. As the spring brake controller drum 97 is further displaced beyond the "1st spring" position, it passes successively through positions, designated respectively the "2nd spring," "3rd spring," and "4th spring" positions, in which the contact segment successively disengages contact members 102, 101, and 100 in the order named. The "4th spring" position is attained before the dynamic brake controller drum 82 reaches the "3rd dynamic" position thereof and, consequently, before the track brake rheostat 78 establishes the circuit for energizing the windings of the track brake devices.

The engagement and disengagement of contact segment 98 of spring brake controller 79 with the contact members 100, 101, 102 and 103 controls a plurality of relays 106, 107, 108, and 109 which in turn control the amount of a resistor 110 that is included in the energizing circuit of the torque motors 35 of all the brake units on the car.

The relays 106 to 109 are of identical and standard construction and each comprises a single contact member which is actuated from an open position to a closed position, when the winding of the relay is energized, and returned to open position when the winding is deenergized.

Associated with the relays 106 to 109 is a so-called suppression relay 112. Relay 112 has two contact members 113 and 114 hereinafter designated the "front" and "back" contact members respectively, that are actuated from open and closed positions respectively, to closed and open positions respectively, in response to energization of the electromagnet winding 115 of the relay. The electromagnet winding of relay 112 is connected in the dynamic braking circuit of the motors 17 and is designed to pick-up, that is shift the front and back contact members to and hold them in closed and open positions respectively, as long as it is energized by a dynamic braking current exceeding a certain value and corresponding to a certain degree of dynamic braking effect. Relay 112 functions in a manner hereinafter described to suppress or prevent application of the friction brake units as long as the dynamic braking effect exceeds this certain degree.

Each of the latch solenoid windings 61 is connected in a branch wire 116, which is connected across the negative bus wire 93 and a so-called solenoid bus wire 117, that is, in turn, connected by a branch wire 118 to the contact finger 104 of the spring brake controller 79. It will thus be seen that whenever the contact finger 104 of spring brake controller 79 is connected to the positive terminal of the battery 91 through contact segment 98, in the manner hereinafter to be described, the latch solenoid windings 61 are energized; and that when the contact segment 98 disengages the contact finger 104, the energizing circuit for the latch solenoid windings 61 is interrupted and the windings deenergized.

*Operation*

Let it be assumed that the car is traveling along the road under power with the power controller 74 in the "On" position thereof, thus causing current to be supplied to the propulsion motors to drive the car, and also that the controllers 77, 78, and 79 are in the "Running" position thereof so that the brakes are released. As previously explained, the contact segment 98 of spring brake controller drum 97 is effective to connect the contact members 99 and 104 in the "Running" position of the controller so that the latch solenoid windings 61 of the friction brake units are all energized.

This circuit for energizing the latch solenoid windings 61 extends from the positive terminal of the battery 91 by way of wires 122 and 121, back contact 114 of the suppression relay 112 which is dropped-out because the dynamic brake circuit is interrupted, contact member 99, contact segment 98, contact member 104, branch wire 118, latch solenoid bus wire 117, in parallel relation through branch wires 116 including the latch solenoid windings 61, negative bus wire 93, and branch wire 96 to the negative terminal of the battery 91. Thus, although the circuit for energizing the windings of the torque motors 35 is interrupted, as will presently appear, the brake shoes 24 are held in release position because the latch levers 56 hold the sleeves 39 of the screw-jacks 36 in raised position.

Let it now be further assumed that the operator desires to effect an application of the brakes. To do so, he first shifts the power controller 74 to "Off" position, thereby interrupting the supply of propulsion current to the motors 17 and at the same time closing the interlock switch 76 in the dynamic brake circuit. He then, through the medium of the manually operable brake handle or foot-pedal, causes displacement of the controllers 77, 78, and 79 out of the "Running" position thereof in the direction indicated by the arrows to a degree corresponding to the desired degree of application of the brakes.

When the spring brake controller drum 97 reaches a position corresponding to the "Release" position of the dynamic brake controller drum 82, the contact segment 98 thereon engages the contact members 100, 101, 102, and 103 while at the same time remaining in engagement with the contact members 99 and 104.

With the contact member 99 connected to the positive terminal of the battery 91 through the back contact 114 of the suppression relay 112, as previously explained, the engagement of the contact segment 98 with the contact member 103 establishes a circuit for energizing the relay 106. This circuit extends from the positive terminal of the battery 91 to the contact member 99 as previously traced and then by way of the contact segment 98, contact member 103, a wire 123 and a branch wire 124 thereof, winding of the relay 106, a wire 125 and wire 96 to the negative terminal of the battery 91.

The relay 106 is effective when picked-up as just described to complete a circuit for energizing the windings of the torque motors 35. This circuit extends from the positive terminal of the battery 91 by way of the wires 122 and 121, a branch wire 128 including the contact members of the relay 106, a bus wire 127, then in parallel through the windings of all of the torque motors 35 to the negative bus wire 93, and back through the branch wire 96 to the negative terminal of the battery 91.

The engagement of the contact segment 98 with the contact members 100, 101, 102, is effective to cause energization of the windings of the relays 109, 108 and 107, respectively because the windings of these relays are connected in parallel relation with each other and with the winding of the relay 106 between the contact segment 98 and the wire 125 which is connected to the negative terminal of the battery 91.

The relay 109 is effective, when picked-up, to connect the wire 121 to the wire 126 through the entire resistor 110. In a similar manner, the relay 108 is effective, when picked-up, to connect the wire 121 to the wire 126 through only a fractional portion of the resistor 110, while the relay 107 is effective, when picked-up, to establish a connection between the wires 121 and 126 through a fractional portion of the resistor 110 which is less than that included by the relay 108.

It will thus be seen that the pick-up of the relays 107, 108, and 109 is without immediate effect because the relay 106 is effective to shunt the entire resistor 110. Accordingly, in the "Release" position of the spring brake controller, the windings of the torque motors 35 are energized by a maximum current. This current is sufficient to produce a torque on the motor shaft 53 sufficient to slightly raise the sleeve 39 of the screw-jack from the latch position thereby relieving the downward pressure of the latch lug 55 on the latch lever 56 and enabling the latch lever to be withdrawn readily in the manner presently to be described.

When the dynamic brake controller drum 82 reaches the "1st dynamic" position thereof, the contact segment 83 engages the two upper contact members 84 and thereby establishes the dynamic braking circuit for the motors 17. This circuit is readily apparent and needs no description except to point out that for this position of the dynamic brake controller drum 82, the entire amount of the resistor 85 is included in the dynamic braking circuit, thereby limiting the dynamic braking current in the circuit to a minimum value so that a correspondingly minimum dynamic braking effect is produced.

As previously explained, the spring brake controller drum 97 reaches its "1st spring" position at the time the dynamic brake controller drum 82 reaches its "1st dynamic" position. Thus, due to the fact that the contact segment 98 of the spring brake controller 79 disengages the contact member 103 in its "1st spring" position, the circuit for energizing the relay 106 is interrupted and, at the same time, the dynamic braking circuit is established.

When the dynamic braking circuit is established, the current is built-up rapidly therein to a value dependent upon the resistance of the resistor 85. There is, however, a short measurable time lag in the building-up of the dynamic braking current and, consequently, the suppression relay 112 is not picked-up until a short interval of time has elapsed following the establishment of the dynamic braking circuit. It follows therefore that the relay 106 drops out.

It will also be apparent that one or more of the relays 107, 108, and 109 may remain picked-up or they may all be dropped-out, depending upon the degree of displacement of the spring brake controller out of its "Running" position.

Obviously, therefore, since the latch lever 56 of each friction brake unit has been previously withdrawn due to deenergization of the latch solenoid windings 61 following disengagement of contact segment 98 from contact member 104 when the controller drum left the "Release" position, spring 27 accordingly becomes effective to apply the brake shoes 24 to a greater or less degree depending upon the position to which the brake controller 79 is operated by the operator.

When the suppression relay 112 picks-up in response to the attainment of sufficient dynamic braking current, the closing of the front contact member 113 thereof completes a circuit for energizing the relay 106 independently of the spring brake controller 79. This circuit extends from the positive terminal of the battery 91 by way of the wire 122, front contact 113 of relay 112, wires 123 and 124, winding of the relay 106, and wires 125 and 96 to the negative terminal of the battery 91. Thus, the relay 106 is momentarily dropped-out and then picked-up again, with the result that the torque motor windings are again energized to the maximum value to again effect a release of the friction brakes.

The degree of application of the dynamic brakes will vary dependent upon the degree of displacement of the dynamic brake controller drum 82 out of the "Running" position thereof. It will be apparent that such is the case because as the controller drum 82 passes through the 2nd, 3rd, and 4th positions thereof, a successively increasing part of the resistor 85 is shunted by the contact segment 83, thereby reducing the resistance in the dynamic braking circuit and producing a higher dynamic braking current and a proportionately higher dynamic braking effect. In the "Full dynamic" position of the dynamic brake controller drum 82, the contact segment 83 shunts the entire resistor 85, thus causing a maximum dynamic brake current and a corresponding maximum dynamic braking effect to be established.

After the suppression relay 112 is once picked-up in response to a sufficient dynamic braking current, the friction brake units are held in release position, as previously explained, for any position of the dynamic brake controller 77 as long as the current is sufficient to pick-up suppression relay 112.

The magnetic track brake devices 71 are not applied unless the degree of displacement of the dynamic brake controller drum 82 is such as to pass the "3rd dynamic" position. In the position of the track brake rheostat brush arm 87 corresponding to the "3rd dynamic" position of the dynamic brake controller 82, the brush arm 87 first connects the two resistors 88 to establish the energizing circuit for the electromagnet windings 71a of the track brake devices 71. As the degree of displacement of the dynamic brake controller increases beyond the "3rd dynamic" position, the brush arm 87 of the track brake rheostat 78 correspondingly cuts out increasing portions of the two resistors 88 to thereby increase the energizing current of the electromagnet windings 71a and the degree of application of the track brake devices 71.

When the speed of the car reduces sufficiently so that the current in the dynamic braking circuit reduces to a value insufficient to maintain the suppression relay 112 picked-up, the friction brake units are applied, the degree of application depending upon the position of the controllers.

Although not shown, suitable means of well-known construction is provided for locking the controllers 77, and 79 and the brush arm 87 of track brake rheostat in a position corresponding to the "4th spring" position of the spring brake controller 79 when it is desired to hold the brakes applied while the car is not in motion. As previously indicated, the brush arm 87 of the track brake rheostat 78 does not establish the energizing circuit for the track brake magnet windings 71a until after the spring brake controller drum 97 has passed the position corresponding to the "4th spring" position. Thus, the spring-applied brakes may be applied to the maximum degree to serve as parking brakes without energization of the track brake magnet windings. The consequent drain of current from the battery 91 is avoided. Obviously with the car stopped, the suppression relay 112 will be dropped-out because of the absence of dynamic braking current and, accordingly, with all of the relays 106, 107, 108 and 109 dropped out as they are in the "4th spring" position of the spring brake controller, the torque motors will be deenergized and the brake shoes applied with maximum force.

When it is desired to release the brakes prior to again starting the car, the operator effects the return of the controllers 77 and 79 and track brake rheostat brush arm 87 to the normal or "Running" position thereof. With the suppression relay 112 dropped-out as it is when the car is stopped, the contact member 99 of the spring brake controller 79 will be connected to the positive terminal of the battery 91 by back contact 114 of relay 112. Thus, in returning from the "4th spring" position to "Release" position, the contact segment 98 on the spring brake controller 97 successively engages the contact members 100, 101, 102, and 103 to cause the relays 109, 108, 107, and 106 to be successively picked-up.

It will thus be seen that with the relay 106 picked-up, maximum energizing current is again supplied to the torque motors 35 to effect the complete release of the brake shoes 24 prior to the time that the spring brake controller drum 97 reaches the "Release" position thereof. When the contact segment 98 on the controller drum 97 reaches the "Release" position thereof, it engages the contact member 104 to effect energization of the latch solenoid windings 61, with the result that the latch levers are actuated into latching or locking position beneath the projecting lugs 55 on the outer sleeves 39 of the screw-jacks 36.

As previously indicated, the upward force exerted on the sleeve 39 by the torque motor 35 in response to the maximum degree of energization thereof provides a slight clearance between the lugs 55 and the latch lever 56. Thus the levers may be rocked into locking position without interference by lugs 55.

In shifting from the "Release" position to the "Running" position, the contact segment 98 of the spring controller drum 97 remains in engagement with the contact members 99 and 104 but disengages the contact members 100, 101, 102, and 103. Thus, the circuits for energizing the relays 106, 107, 108, and 109 are interrupted and the relays dropped-out to effect interruption of the energizing circuit for the torque motors 35. Each latch lever 56 remains effective, however, to prevent the application of the corresponding brake shoes by the spring 27 because it prevents the downward movement of the outer sleeve 39 of the screw-jack 36. Accordingly, the consumption of electric current by the torque motors 35 and the consequent drainage of the battery 91 is avoided in the normal or "Running" position of the controllers. The current consumed by the latch solenoid windings 61 is relatively small compared to that of the torque motors and is accordingly unobjectionable.

Embodiment shown in Fig. 5

It will be recalled that in the equipment shown in Fig. 2, the friction brake units associated with the brake drums 23 were momentarily applied and then released upon initiation of an application of the brakes due to the slight interval of time required to cause pick-up of the suppression relay 112 following establishment of the dynamic braking circuit. Such operation is not objectionable but it serves no useful purpose and may therefore be avoided, if desired, by a control arrangement, such as disclosed in Fig. 5, wherein certain modifications are made in the control apparatus shown in Fig. 2.

In view of the fact that the control apparatus of Fig. 5 duplicates that of Fig. 2 in large measure, corresponding parts and circuits are designated by the same reference numerals and a description thereof is not repeated. Only those features and parts of the control apparatus of Fig. 5 differing from that of Fig. 2 will therefore be described.

The control apparatus shown in Fig. 5 differs from that shown in Fig. 2 in having two thermal responsive switch devices 131 and 132 respectively, which function to control the energizing circuit for the latch solenoid windings 61 and that for the torque motors 35, respectively, in a manner presently to be described.

The thermal switches 131 and 132 are similar in construction and each comprises a bi-metallic element 133 for operating a contact member 134 into and out of engagement with a pair of stationary contact members 135 in accordance with the distortion or non-distortion thereof out of a normal position in response to heat applied thereto by a heating coil 136.

The controller drum 79 in Fig. 5 has a contact segment 98a which differs slightly from the contact segment 98 in that it has an extension adapted to engage an additional contact member 105 only in the "Running" and "Release" positions of the controller. One terminal of the heating coil 136 of switch device 131 is connected to the contact member 105, while the other terminal is connected to the wire 125 and thus to the negative terminal of the battery 91. With the suppression relay 112 dropped-out and the back contact member 114 thereof correspondingly connecting the contact member 99 of the controller 79 to the positive terminal of the battery 91, it will be seen that the heating coil 136 of switch device 131 is energized only while the controller is in either "Running" or "Release" position. The bi-metallic operating element 133 is distorted out of its normal position in response to the heat developed by energization of the heating coil 136 and thereby shifts the contact member 134 into circuit-closing contact with the associated contact members 135.

One of the contact members 135 of the thermal switch 131 is connected by a wire 141 to the branch wire 121 that is, in turn, connected to the positive terminal of the battery 91. The other contact member 135 of thermal switch 131 is connected by a wire 142 to the wire 118 leading to the latch solenoid bus wire 117. Thus switch device 131 is effective in its closed position to by-pass or shunt the connection between the positive terminal of battery 91 and wire 118 through back contact 114 of relay 112 and the contact segment 98 of spring brake controller 97.

The thermal switch device 131 is of such character that the contact member 134 is not disengaged from the contact members 135 until a certain interval of time elapses following the deenergization of the heating coil 136. When the operator shifts the controller 79 out of "Release" position to an application position, the contact segment 98a disengages contact member 105 and thereby interrupts the energizing circuit of heating coil 136. The energizing circuit of the latch solenoid windings 61 is not, however, interrupted until the thermal switch device 131 opens a certain limited time interval thereafter.

The time interval that the thermal switch device 131 remains closed following the displacement of the spring brake controller 79 out of its "Release" position toward an application position is sufficiently long to permit the dynamic braking current in the dynamic braking circuit to build-up to a value sufficient to pick-up the suppression relay 112. Accordingly, notwithstanding the failure of the suppression relay 112 to pick-up instantly in response to the initiation of an application of the brakes, the latch solenoid windings 61 remain energized so as to hold the friction brake units released to a time long enough for the dynamic brakes to become effective to suppress the application of the friction brake units.

It will be apparent, further, that depending upon the degree of displacement of the spring brake controller 79 out of its "Running" position, one or more of the relays 106, 107, 108 and 109 will be dropped out so that the current supplied to energize the torque motors 35 will be diminished in varying degrees from the maximum value. The coil spring 27 of each of the brake units will accordingly urge the outer sleeve 39 of the screw-jack 36 downwardly on the latch lever 56 so that, when the latch winding 61 is deenergized in response to the opening of the thermal switch device 131, the spring 59 may be of insufficient strength to withdraw the latch lever 56. It is, therefore, desirable to maintain the torque motors 35 energized to the maximum degree until after the thermal switch device 131 is interrupted because, as previously indicated, with the torque motors energized to a maximum degree, the outer sleeve 39 is raised sufficiently to permit the easy entry and exit of the latch lever 56 under and out of a position under the projecting lug 55 on the sleeve 39. As will be presently explained thermal switch device 132 functions to accomplish this desirable result.

In Fig. 5, relay 106 is provided with an additional contact member 143 which is in open position when the relay winding is deenergized and which is actuated to a closed position when the relay winding is energized. The contact member 143 is connected in series relation with the contact members 134 and 135 of the thermal switch 132 in a wire 144 which connects the branch wire 121 to the wire 124.

As in Fig. 2, the movement of the controller 79 from "running" position to an application position causes momentary pick-up of the relay 106 due to the momentary engagement of the contact segment 98a with the contact member 103 in moving past the row of contact members. When the contact member 143 of the relay 106 is actuated to closed position, it establishes a holding circuit for maintaining the winding of relay 106 energized, independently of the spring brake controller 79, which holding circuit is subject to the opening of the normally closed contact members of the thermal switch 132.

One terminal of the heating coil 136 of the thermal switch 132 is connected to the wire 125 and thus to the negative terminal of the battery 91, while the other terminal is connected to the wire 144 at a point between the contact 143 of the relay 106 and the contacts of the thermal switch 132. Accordingly, simultaneously with the establishment of the holding circuit for the relay 106 by the contact member 143 thereof, a circuit is also established by contact member 143 for energizing the heating coil 136 of the thermal switch 132. The characteristic of the thermal switch 132 is such that the heating coil 136 must be energized for a certain length of time in order to effect operation of the contact member 134 out of engagement with its associated contact members 135. This time is longer than that required to effect opening of thermal switch device 131 following deenergization of the heating coil 136 thereof.

It will thus be seen that no matter how rapidly the operator shifts the controller 79 from the "running" position to an application position, the thermal switch 132 maintains a holding circuit for the relay 106 for a certain interval of time and then interrupts the holding circuit to permit dropping-out of the relay 106. Such drop-out of relay 106 occurs, moreover, after the latch lever 56 has been withdrawn in response to the deenergization of the latch solenoid windings 61 as a result of opening of thermal switch device 131.

Since each torque motor 35 is energized to a maximum degree sufficient to prevent the exertion by coil spring 27 of a downward force through sleeve 39 on the latch lever 56 as long as relay 106 is picked-up, it will be seen that the thermal switch 132 prevents the undesired jamming of the latch lever 56 in a manner to prevent the application of the spring-applied brakes.

If the operator rapidly restores the spring brake controller 79 from an application position to "running" position thereof, the latch solenoid windings 61 will be energized simultaneously with the full or maximum energization of the torque motors in the "release" position of the controller. Thus, before the circuit for energizing the torque motors is interrupted in the "running" position of the spring brake controller 79, the latch levers 56 become effective to hold the sleeves 39 of screw-jacks 36 in their raised position maintaining the friction brakes released. This operation is identical with that of the control apparatus of Fig. 2.

*Summary*

Summarizing, it will be seen that I have provided a brake equipment for vehicles, such as street railway cars, in which a novel control system is disclosed for coordinating the operation of dynamic brakes, magnetic track brakes and friction brakes of the spring-applied, torque-motor-controlled type.

In one embodiment, the dynamic brakes are applied initially and are effective to suppress an application of the spring-applied friction brakes as long as the dynamic braking effect exceeds a certain value. In this embodiment, momentary application of the spring-applied friction brake is permitted during the interval of time in which the dynamic braking current is building-up.

The dynamic brakes, track brakes, and spring brakes are respectively controlled by synchronously operative controllers and are adapted to be locked in a parking position corresponding to the maximum degree of application of the spring-applied brakes. In this position of the controllers, however, the track brake controller is ineffective to cause energization of the track brake magnet windings.

The spring brake controller is adapted, upon return to its normal position, to effect sequentially the full energization of the torque motor to effect release of the friction brakes, the operation of a latch device into a position preventing the application of the spring-applied brakes, and finally the deenergization of the torque motor. The spring-applied brakes are thus held released by the latch device to obviate the necessity for the consumption of current by the torque motor normally while the brakes are released.

A modified control arrangement is disclosed employing two time-controlled devices in the form of thermal-responsive switches which cooperatively function to prevent the momentary application of the friction brakes while the dynamic braking current is building-up in response to initiation of the brake application. One of the thermal switches delays for a predetermined time the opening of the latch solenoid winding circuit to prevent the unlatching of the latch device before the dynamic brakes become effective to suppress the friction brake application. The other thermal switch is effective to cause the torque motors to be maintained fully energized for a time longer than the time required for the first thermal switch to open. Thus at no time is the brake-applying spring of the friction brakes effective to exert a jamming force on the latch device.

While I have disclosed only several specific embodiments of my invention, it will be apparent that various omissions, additions or modifications may be made therein without departing from the spirit thereof. It is accordingly not my intention to limit the scope of my invention except as it is necessitated by the scope of the appended claims.

Having now described my invention, what I claim as new and desire to secure by Letters Patent is:

1. Vehicle brake apparatus comprising a dynamic brake device adapted to exert a retarding effect on the vehicle, a friction brake device, spring means adapted to exert an application force on the friction brake device to cause it to exert a retarding effect on the vehicle, electrical means effective to exert a force in opposition to the spring means in accordance with the degree of energization thereof so as to vary the force of application of the friction brake means and to effect the release thereof, means for simultaneously initiating an application of the dynamic brake means and of the friction brake means, and means effective as long as the dynamic brake device exerts a retarding effect in excess of a certain value for maintaining the electrical means energized to a degree sufficient to maintain the friction brake means released.

2. Vehicle brake apparatus comprising, in combination, a dynamic brake device adapted to exert a retarding effect on the vehicle, a friction brake device, spring means adapted to exert a force causing application of the friction brake device, electrical means effective in accordance with the degree of energization thereof to exert a force in opposition to the spring means so as to vary the degree of application and to effect the release of the friction brake means, control means having a normal position and operative out of said normal position to simultaneously initiate application of the dynamic brake device and of the friction brake device, said control means being effective in accordance with the degree of displacement thereof out of the normal position to vary the degree of application of the dynamic brake device and of the friction brake device, and means effective as long as the braking effect produced by the dynamic brake device exceeds a certain value for maintaining said electrical means energized to a degree sufficient to maintain the friction brake means released independently of said control means and effective when the dynamic brake device produces a braking effect less than said value to restore the control of said electrical means to said control means.

3. Vehicle brake apparatus comprising, in combination, a dynamic brake device for exerting a retarding effect on the vehicle, a dynamic brake control device for initiating and controlling the degree of application of the dynamic brake device, a friction brake device effective upon application to exert a retarding effect on the vehicle, spring means adapted to exert a force causing application of said friction brake device, a torque motor having a rotary element on which a torque force variable according to the degree of energization of said motor is exerted, an element subject to the torque force exerted on the rotary element of said motor and adapted to exert a corresponding force in opposition to said spring means to vary the degree of application of the friction brake device and to effect the release thereof, a friction brake control device adapted to control the degree of energization of said torque motor, said friction brake control device being movable in synchronism with the dynamic brake control device to reduce the degree of energization of said torque motor as the degree of application of the dynamic brake device is increased, whereby the degree of application of the friction brake device is correspondingly increased, and means effective as long as the dynamic brake device exerts a braking effect in excess of a certain value for maintaining said torque motor energized to a degree sufficient to maintain the friction brake means released independently of the friction brake control device and effective when the dynamic braking effect reduces below said certain value to restore the control of the torque motor to the said friction brake control device.

4. Vehicle brake apparatus comprising, in combination, a propulsion motor for said vehicle adapted to be connected in a dynamic braking circuit as a generator to exert a dynamic braking effect on the vehicle, friction brake means effective upon application to exert a retarding effect on the vehicle, spring means adapted to exert a force causing application of the friction brake means, a torque motor having a rotary element on which a torque force variable according to the degree of energization of said motor is exerted, an element adapted to exert a force, corresponding to the torque force exerted on the rotary element of the torque motor in opposition to the said spring means to vary the degree of application of the friction brake means and to effect the release thereof, electrically controlled means for holding said friction brake means released independently of said torque motor, and control means adapted to establish the dynamic braking circuit including said propulsion motor, to control the degree of energization of said torque motor, and to control said electrically controlled means.

5. Vehicle brake apparatus comprising, in combination, a propulsion motor for said vehicle adapted to be connected in a dynamic braking circuit to act as a generator and exert a retarding effect on the vehicle, friction brake means effective upon application to exert a retarding effect on the vehicle, spring means for causing application of said friction brake means, a torque motor having a rotary element on which a torque force is exerted in accordance with the degree of energization of the torque motor, an element adapted to exert a force corresponding to the torque force on the rotary element of the torque motor in opposition to said spring means to vary the degree of application of the friction brake means and to effect release thereof, control means effective upon movement in one direction out of a certain position to establish and vary the current in the dynamic braking circuit and also to vary the degree of energization of said torque motor to correspondingly control the degree of application of the dynamic brake means and of the friction brake means, and electroresponsive means controlled by the current in the dynamic braking circuit and effective as long as the current in said circuit exceeds a certain value for causing said torque motor to be maintained energized sufficiently to maintain the said friction brake means released independently of the control means.

6. Brake apparatus for a rotary element comprising, in combination, friction brake means, a spring adapted to exert a force causing application of the brake means, a torque motor having a rotary element on which a torque force is exerted in accordance with the degree of energization of the motor, an element adapted to exert a force, corresponding to the force exerted on the rotary element of the torque motor, in opposition to the spring means to vary the degree of application of the friction brake means and to effect the release thereof, a latch member operative into cooperative engagement with said element whereby to hold it in a position maintaining said friction brake means in release position, electroresponsive means effective upon energization to operate said latch member into cooperative engagement with said element and hold it therein, biasing means effective upon deenergization of the electroresponsive means to shift said latch member out of cooperative engagement with said element, and a control device having a normal position in which the electroresponsive means is energized and the torque motor deenergized and effective upon movement in one direction out of said normal position to effect energization of the torque motor to a maximum degree sufficient to hold the friction brake means released while the electroresponsive means is still energized and then to effect deenergization of said electroresponsive means, and thereafter effective upon further displacement out of the normal position to progressively decrease the degree of energization of said torque motor whereby the degree of application of the friction brake means is progressively increased.

7. Brake apparatus for a wheeled vehicle operating on track rails comprising, in combination, friction brake means effective upon application to exert a retarding force on the wheels of the vehicle, spring means adapted to exert a force causing application of the friction brake means, electrical means effective in accordance with the degree of energization thereof to cause a variable force to be exerted in opposition to said spring means to vary the degree of application of the friction brake means and to effect the release thereof, control means having a certain position in which it effects energization of the electrical means to a degree sufficient to maintain the friction brake means released and operative out of said cetrain position to progressively decrease the degree of energization of said electrical means whereby said spring means progressively increases the degree of application of the friction brake means, an electromagnetic track brake device adapted upon energization to frictionally engage the rails on which the wheels of the vehicle roll to exert a retarding effect on the vehicle, a second control device operative in synchronism with the first said control device adapted to initiate energization of said electromagnetic track brake device only after the energization of said electrical means is reduced to a minimum degree corresponding to the maximum degree of application of the friction brakes.

8. Brake apparatus for a rotary element comprising in combination, friction brake means, spring means adapted to exert a force causing application of said friction brake means, electrical means effective to cause the exertion of a force varying according to the degree of energization thereof in opposition to the spring means whereby to vary the degree of application of the friction brake means and to effect the release thereof, holding means for maintaining said friction brake means released independently of the electrical means, a control device having a certain position in which it causes energization of the electrical means to a degree sufficient to effect release of the friction brake means and in which it renders said holding means effective and operative out of said certain position to render said holding means ineffective and to effect a reduction of the degree of energization of said electrical means so as to permit application of the friction brake means, and means effective for a certain limited time after said control device is operated out of its said certain position for causing said holding means to remain effective to hold the friction brake means released.

9. Brake apparatus for a rotary element comprising, in combination, friction brake means, spring means adapted to exert a force causing application of the friction brake means, electrical means effective to exert a force variable according to the degree of energization thereof in opposition to the spring means so as to vary the degree of application of the friction brake means and to effect the release thereof, electroresponsive means effective when energized to cause the friction brake means to be held in the release position independently of the electrical means, a control device having a certain position in which it causes energization of the electrical means to a degree sufficient to effect release of the friction brake means and in which it causes energization of said electroresponsive means and operative out of said certain position to effect deenergization of said electroresponsive means and a reduction in the degree of energization of said electrical means so as to permit application of the friction brake means, and a thermal-responsive switch device having a heating coil adapted to be energized in the said certain position of the control device and deenergized upon movement of said control device out of said certain position, said thermal-responsive switch device being closed as long as said heating coil is energized and also closed for a certain interval of time after said heating coil is deenergized to maintain said electroresponsive means energized.

10. Brake apparatus for a rotary element comprising, in combination, friction brake means, spring means adapted to exert a force causing application of said friction brake means, electrical means effective to cause exertion of a force variable in accordance with the degree of energization thereof in opposition to the spring means so as to vary the degree of application of the friction brake means and to effect the release thereof, holding means for maintaining said friction brake means released independently of the electrical means, a control device having a certain position in which it causes energization of said electrical means to a degree sufficient to effect release of the friction brake means and in which it renders said holding means effective and operative out of said certain position to render said holding means ineffective and also to effect a reduction in the degree of energization of the electrical means to permit application of the friction brake means, means effective for a certain limited time after said control device is operated out of its said certain position for causing said holding means to remain effective to hold the friction brake means released, and means adapted to cause said electrical means to be energized to a degree sufficient to maintain the friction brake means released until after said holding means is rendered ineffective.

11. Vehicle brake apparatus comprising, in combination, a dynamic brake device, a friction brake device, control means having a certain position in which both of the brake devices are released and effective upon movement out of said certain position to simultaneously initiate application of both brake devices, electrical suppression means responsive to the degree of braking effect produced by the dynamic brake device and effective after a certain interval of time elapses following shifting of the control means out of its said certain position to prevent the application of the friction brake device as long as the dynamic brake device exerts a braking effect in excess of a certain degree and thereafter effective to permit application of the friction brake device, and means effective for a limited time interval following the operation of the control means out of its certain position, which interval is longer than the first said certain interval of time, for preventing the momentary application of the friction brake device while said suppression means is not yet effective following initiation of a brake application.

12. Brake apparatus for rotary element comprising, in combination, friction brake means, spring means adapted to exert a force causing application of the brake means, electrical means adapted to be deenergized to different degrees, an element adapted to exert a force in opposition to said spring means in accordance with the degree of energization of said electrical means whereby to vary the degree of application of the friction brake means and to effect release thereof, a latch member operative into engagement with said element to maintain it in a position to maintain the friction brake means released independently of the electrical means, electroresponsive means effective when energized for operating said latch member into and maintaining it in cooperative engagement with said element, a control device effective upon movement out of a certain position to initiate a reduction in the degree of energization of said electrical means and effect deenergization of said electroresponsive means, a thermal-responsive switch device effective upon operation of the control device out of its certain position for maintaining said electroresponsive means energized for a certain limited time, and a second thermal-responsive switch device effective for a second certain limited time, longer than the first said certain limited time, following operation of the control device out of its certain position for maintaining said electrical means energized to a degree sufficient to maintain said friction brake means released.

13. Brake apparatus for a rotary element comprising, in combination, friction brake means, spring means adapted to exert a force causing application of the friction brake means, a torque motor having a rotary element on which a torque force is exerted variable in accordance with the degree of energization of the torque motor, an element adapted to exert a force, corresponding to the torque force exerted on the rotary element of the torque motor, in opposition to the spring means to vary the degree of application of the friction brake means and to effect the release thereof, electroresponsive means effective upon energization to hold said element in a position maintaining said brake means released independently of energization of the torque motor, a control device having a certain position in which said torque motor is deenergized and said electroresponsive means is energized and operative out of said certain position to effect sequentially the energization of said torque motor to a degree sufficient to maintain the friction brake means released, the deenergization of the electroresponsive means, and the progressive diminution in the degree of energization of said torque motor whereby the degree of application of the friction brake means is progressively increased, a thermal-responsive switch device having a heating coil adapted to be energized while the control device is in its said certain position and deenergized upon operation of the control device out of its certain position, said switch device being actuated to a closed position in response to energization of said heating coil to maintain the said electroresponsive means energized and adapted to be opened in response to deenergization of said heating coil only after a certain limited time has elapsed following movement of the control device out of its said certain position, and a second thermal-responsive switch device having a heating coil which is deenergized in said certain position of the control device and which is energized upon operation of the control device out of its said certain position, said second thermal-responsive switch device being effective for a certain interval of time longer than that required for the first said thermal-responsive switch device to open following operation of the control device out of its said certain position for preventing a reduction from the degree of energization of said torque motor sufficient to maintain the friction brake means released.

14. Brake apparatus for a wheeled vehicle comprising, in combination, a propulsion motor adapted to function as a dynamic brake device for the vehicle, a friction brake device associated with the wheels of the vehicle, spring means adapted to exert a force causing application of said friction brake device, a torque motor having a rotary element on which a variable torque force is exerted in accordance with the degree of energization of the torque motor, an element adapted to exert a force corresponding to the torque force on the rotary element of the torque motor in opposition to the spring means to vary the degree of application of the friction brake device and to effect the release thereof, control means having a normal position and operative out of said normal position to initiate simultaneously the application of the dynamic brake device and the friction brake device, suppression means effective a certain time after application of the dynamic brake device is initiated and thereafter as long as the degree of dynamic braking effect exceeds a certain degree for maintaining the torque motor energized to a degree sufficient to prevent the application of the friction brake device, electroresponsive means effective in the normal position of the control means to hold said element in a position maintaining the friction brake device released independently of energization of the torque motor, means effective for a certain limited time, longer than said certain time, following the operation of the control means out of its normal position for maintaining said electroresponsive means energized to hold said element in a position maintaining the friction brake device released until said suppression means becomes effective, and means effective upon operation of the control means out of its normal position for maintaining said torque motor energized to a degree sufficient to maintain the friction brake means released for a second certain limited time longer than the first said certain limited time.

15. Vehicle brake apparatus comprising, in combination, dynamic brake means including a dynamic braking circuit, friction brake means, control means having a certain position in which both of the said brake means are released and effective upon movement out of said certain position to establish said dynamic braking circuit to cause the dynamic brake means to exert a retarding effect on the vehicle and, simultaneously therewith, to initiate application of said friction brake means, electroresponsive means controlled by the current in the dynamic braking circuit and effective, upon the elapse of a certain interval of time following the shifting of the control means out of its said certain position, to prevent the application of said friction brake means as long as the current in the dynamic braking circuit exceeds a certain value and adapted to permit the application of said friction brake means when the current in the dynamic braking circuit reduces below said certain value, and means effective for a second certain interval of time following the operation of the control means out of its certain position, which second interval is longer than the first said interval of time, for preventing the momentary application of said friction brake means while said electroresponsive means is not yet effective following the initiation of a brake application.

16. Vehicle brake apparatus comprising, in combination, dynamic brake means including a dynamic braking circuit effective when established to cause the dynamic brake means to exert a retarding effect on the vehicle, friction brake means effective upon application to exert a retarding effect on the vehicle, spring means for causing application of said friction brake means, electrical means energizable to different degrees to cause the exertion of a variable force in opposition to said spring means to vary the degree of application of the friction brake means and to effect release thereof, control means effective upon movement in one direction out of a certain position to establish and vary the current in said dynamic braking circuit whereby to vary the degree of braking effect exerted by the dynamic brake means and also adapted, simultaneously therewith, to vary the degree of energization of said electrical means to correspondingly control the degree of application of the friction brake means, and electroresponsive means controlled by the current in the dynamic braking circuit and effective as long as the current in said circuit exceeds a certain value for causing said electrical means to be maintained energized to a sufficient degree to maintain said friction brake means released independently of said control means.

17. In a brake apparatus of the type having friction brake apparatus and dynamic brake apparatus including a circuit in which the current varies according to the effectiveness of the dynamic brake apparatus, and means for initiating application of the friction brake apparatus and of the dynamic brake apparatus, the combination of means responsive to current in said circuit above a certain uniform degree for maintaining said friction brake apparatus released, and means operative upon the substantially simultaneous initiation of an application of the dynamic brake apparatus and of the friction brake apparatus for delaying the application of said friction brake apparatus for an interval of time sufficient for said current responsive means to become effective to maintain the friction brake apparatus released.

18. The combination with a spring-applied brake apparatus and a dynamic brake apparatus including a dynamic braking circuit in which the voltage is varied according to the effectiveness of the dynamic brake apparatus, said dynamic brake apparatus being slower acting than said spring-applied brake apparatus, of means responsive to the voltage in said circuit above a certain predetermined degree for maintaining said spring-applied brake apparatus released, a brake controlling device for initiating the application of the spring-applied brake apparatus, and means operative upon the substantially simultaneous initiation of an application of the dynamic brake apparatus and of the spring-applied brake apparatus for delaying the application of said spring-applied brake apparatus for an interval of time sufficient for said voltage-responsive means to become effective to maintain said spring-applied brake apparatus released.

ARTHUR G. LARSON.